March 16, 1948.  J. J. SANTIAGO  2,437,836
SAFETY PRESSURE RELEASE
Filed April 7, 1945
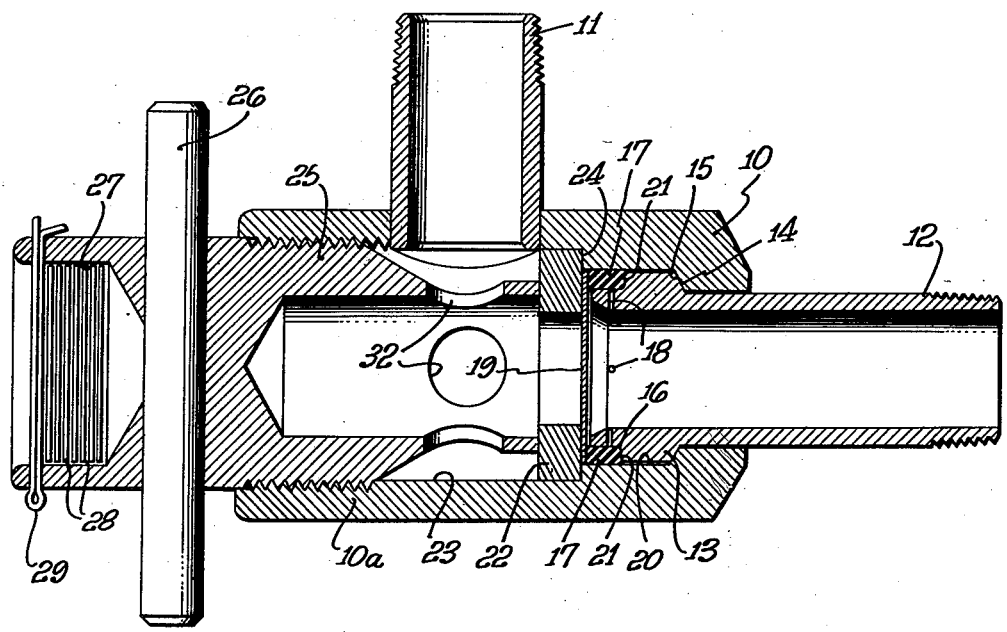
James J. Santiago
INVENTOR.
BY
ATTORNEY Patented Mar. 16, 1948

2,437,836

UNITED STATES PATENT OFFICE 2,437,836

SAFETY PRESSURE RELEASE

James J. Santiago, Los Angeles, Calif., assignor to Grant Oil Tool Company, Los Angeles, Calif., a corporation of California Application April 7, 1945, Serial No. 587,099

5 Claims. (Cl. 220—89)

This invention has to do with safety fluid pressure release devices, particularly of a type adapted to be installed in a high pressure line, as at the discharge side of an oil well mud pump or in other situations where dangerously high pressures may be developed.

One major object of the invention is to provide a pressure release device of the rupturable disc type, incorporating various improvements for the maintenance of an effective fluid-tight seal against the disc, and the adaptability of the device for connection with pipes in varying relationships.

With respect to the fluid seal, the invention contemplates the use of an elastic deformable sealing ring, preferably of rubber, engaged against the high pressure side of the disc and maintained under sufficient predetermined axial compression to assure the fluid-tight effectiveness of the seal. In this connection the invention further contemplates a novel mounting of the ring permitting its radial confinement at the inside and yet allowing for communication of fluid pressure tending to radially expand the ring into fluid-tight engagement with the body bore containing the disc.

A further object is to provide a swivel section or connection extending into the body of the device and rotatable to permit interconnection, by way of the pressure release, of pipes of varying relationship. A particular feature is the provision of a single seal ring for preventing fluid leakage about both the disc and swivel connection, preferably by mounting the ring within a recess in the end of the swivel adjacent the disc.

The above mentioned features and objects, as well as various additional aspects and details of the invention will be explained more fully and to better advantage in the following detailed description of the typical embodiment of the invention illustrated by the accompanying drawing, in which:

Fig. 1 is a sectional view of the device; and

Fig. 2 is a fragmentary section illustrating the relationship between the disc, bushing and seal ring before compression of the ring.

The drawing shows the device to comprise a tubular body 10 having an outlet 11 and an inlet end adapted to receive a tubular swivel section or connection 12. The latter has an inner enlargement or head 13 shaped to provide an annular shoulder 14 bearing against the corresponding body shoulder 15. Thus the swivel connection 12 is rotatable within the body and without axial movement.

The swivel 12 is shaped at its inner end to form an exterior annular recess 16 which contains an elastic deformable seal ring 17, made preferably of rubber. The tube 12 contains a plurality of radial passages 18 at the inside of the recess 16 for communicating to the inside of the seal ring 17 the fluid pressure at the high pressure side of the disc 19. The effect of the high fluid pressure communication to the seal ring is to expand and maintain it in fluid-tight engagement with the wall of the body bore 20 and to effect, together with the seal ring engagement with the end 21 of the recess, a fluid-tight seal preventing leakage from the body about the swivel connection.

The inlet normally is closed from the outlet 11 by a suitable member or disc 19, made of metal, plastic or other suitable material, bearing at its high pressure side against the seal ring 17 and engaged at its low pressure side by an annular bushing 22 received within bore 23 and bearing against shoulder 24. The end 10a of the body is closed by a threaded plug 25, the inner reduced diameter end of which engages the bushing 22 to seat it against shoulder 24. The plug 25 may carry a suitable handle 26 to facilitate turning the plug, and the latter may also contain an end cavity 27 to receive extra or replacement discs 28 retained in the cavity by cotter pin 29.

Referring to Fig. 2, it will be observed that before the disc 19 is tightened against it, the seal ring 17 projects an appreciable distance, say in the order of one-eighth inch, beyond the inner end of the swivel connection 12. When the disc and bushing 22 are brought into position such that the disc just initially engages the seal ring, a clearance of about one-half the clearance at 30 between the end of swivel 12 and the disc, exists at 31 between the bushing and shoulder 24. Thus when the bushing is brought into engagement with shoulder 24, the seal ring will have become axially compressed, and the clearance at 30 reduced to about one-half, but without entirely eliminating the clearance so that the disc might become broken as a result of being tightened against the end of the swivel connection. Allowance of the clearance at 30 further favors the maintenance of a tight seal preventing fluid leakage about and to the low pressure side of the disc.

Upon the increase of pressure at the inlet side of the disc beyond a value which the disc is selected to resist, the disc ruptures and the fluid escapes through the bushing 22 and the plug openings 32 to the outlet 11. The disc then may quickly and easily be replaced simply by removing the plug and bushing, substituting an unbroken disc, and returning the parts to the conditions illustrated.

A feature of particular practical importance is the adaptability of the device, by reason of the swivel connection 12, to compensate for varying relationships in the positions of the pipes to be connected to the swivel and discharge 11. Assuming a fixed position pipe connection with the swivel, the body and outlet 12 are capable of 360 degree rotation about the swivel axis in effecting a joint with a line to be connected to the outlet.

I claim:

1. A safety device of the character described, comprising a body having an inlet and an outlet, a fluid pressure rupturable disc contained within a bore in the body and normally sealing said inlet from the outlet, a seat engaged by the low pressure side of the disc, means forming an annular wall spaced from the wall of said bore and forming an annular recess, a rubber ring contained within said recess and having its inner surface engaged and confined by said annular wall, said rubber ring engaging and forming a fluid tight seal against the high pressure side of the disc, and means forming a passage for communicating fluid pressure through said annular wall to said inner surface of the ring.

2. A safety device of the character described, comprising a body having an inlet and an outlet, a fluid pressure rupturable disc contained within a bore in the body and normally sealing said inlet from the outlet, a removable bushing ring engaging the low pressure side of the disc, a plug threaded into the body and bearing against said bushing ring, a tubular swivel connection rotatable within the body without axial movement, and an elastic deformable sealing ring carried by said swivel connection and bearing against the high pressure side of the disc.

3. A safety device of the character described, comprising a body having an inlet and an outlet, a fluid pressure rupturable disc contained within a bore in the body and normally sealing said inlet from the outlet, a removable bushing ring engaging the low pressure side of the disc, a plug threaded into the body and bearing against said bushing ring, a tubular swivel connection rotatable within the body without axial movement, an elastic deformable sealing ring carried by said swivel connection and bearing against the high pressure side of the disc, said sealing ring being axially compressed by virtue of movement of said bushing ring against the disc, and means limiting such movement of the bushing.

4. A safety device of the character described, comprising a body having an inlet and an outlet, a fluid pressure rupturable disc contained within a bore in the body and normally sealing said inlet from the outlet, a removable bushing ring engaging the low pressure side of the disc, a plug threaded into the body and bearing against said bushing ring, a tubular swivel connection rotatable within the body without axial movement, an elastic deformable sealing ring carried within an annular recess in the outside of said swivel connection and bearing against the high pressure side of the disc, means communicating fluid pressure to the inner surface of said sealing ring to expand it radially against the wall of said bore, said sealing ring being axially compressed by virtue of movement of said bushing ring against the disc, and means limiting such movement of the bushing.

5. A safety device of the character described, comprising a body having an inlet and an outlet, a fluid pressure rupturable disc contained within a bore in the body and normally sealing said inlet from the outlet, a removable bushing ring received within a second body bore of larger diameter than said disc-containing bore and engaged by the low pressure side of the disc, a shoulder at the end of said second bore substantially in the plane of the disc and engaged by said ring, and an elastic deformable ring engaging and forming a fluid tight seal against the opposite and high pressure side of the disc and maintained by the pressure of said ring against the disc in a condition of elastic deformation.

JAMES J. SANTIAGO.

REFERENCES CITED

The following references are of record in the file of this patent:

UNITED STATES PATENTS

| Number | Name | Date |
| --- | --- | --- |
| 808,457 | Kraver | Dec. 26, 1905 |
| 1,030,456 | Broadhurst | June 25, 1912 |
| 1,248,578 | Vuilleumier | Dec. 4, 1917 |
| 1,734,186 | Weidmann et al. | Nov. 5, 1929 |
| 1,974,254 | Allen et al. | Sept. 18, 1934 |
| 1,985,012 | Boehm | Dec. 18, 1934 |
| 2,263,840 | Franck | Nov. 25, 1941 |

FOREIGN PATENTS

| Number | Country | Date |
| --- | --- | --- |
| 303,540 | Great Britain | Dec. 31, 1928 |
| 513,426 | Great Britain | Oct. 12, 1939 |